US008848090B2

(12) United States Patent
Koguchi

(10) Patent No.: US 8,848,090 B2
(45) Date of Patent: Sep. 30, 2014

(54) IMAGING DEVICE, IMAGING METHOD, AND A NON-TRANSITORY COMPUTER-READABLE RECORDING MEDIUM

(71) Applicant: FUJIFILM Corporation, Tokyo (JP)

(72) Inventor: Takehiro Koguchi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/228,652

(22) Filed: Mar. 28, 2014

(65) Prior Publication Data

US 2014/0211069 A1    Jul. 31, 2014

Related U.S. Application Data

(63) Continuation of application No. PCT/JP2012/074490, filed on Sep. 25, 2012.

(30) Foreign Application Priority Data

Sep. 30, 2011   (JP) ................................. 2011-218565

(51) Int. Cl.
*H04N 5/222*   (2006.01)
*G03B 13/02*   (2006.01)
*H04N 5/232*   (2006.01)
*H04N 5/235*   (2006.01)
*G03B 17/20*   (2006.01)

(52) U.S. Cl.
CPC ............ *H04N 5/23293* (2013.01); *G03B 13/02* (2013.01); *H04N 5/2353* (2013.01)
USPC ............ 348/333.09; 348/333.11; 348/333.01; 396/296

(58) Field of Classification Search
USPC ............. 348/333.01–333.09, 333.11–333.12; 396/296, 374
See application file for complete search history.

(56) References Cited

U.S. PATENT DOCUMENTS 5,557,358 A     9/1996  Mukai et al.
7,428,381 B2 *  9/2008  Koppetz ........................ 396/296

(Continued)

FOREIGN PATENT DOCUMENTS

JP      5-100288 A    4/1993
JP      5-321982 A    12/1996

(Continued)

OTHER PUBLICATIONS

International Preliminary Report on Patentability issued in PCT/JP2012/074490, mailed on Mar. 6, 2013.
International Search Report issued in PCT/JP2012/074490, mailed on Nov. 13, 2012.

*Primary Examiner* — Kelly L Jerabek
(74) *Attorney, Agent, or Firm* — Birch, Stewart, Kolasch & Birch, LLP

(57) ABSTRACT

An imaging device comprising: a camera mount; an imaging element; an optical finder capable of observing an optical image of an object which goes through an optical system different from the interchangeable lens; an electronic viewfinder capable of superimposing and displaying a taken image based on the image signal and the optical image; a lens information acquiring unit for communicating with the interchangeable lens mounted on the camera mount and acquiring information concerning the interchangeable lens; a communication determination unit configured to determine whether or not the interchangeable lens is communicable with the lens information acquiring unit; and a first display control unit for causing the electronic viewfinder to superimpose and display the taken image and the optical image if the communication determination unit determines that the interchangeable lens is not communicable with the lens information acquiring unit.

11 Claims, 15 Drawing Sheets

(56) References Cited

U.S. PATENT DOCUMENTS

| | | | |
|---|---|---|---|
| 8,013,924 B2 * | 9/2011 | Koppetz | 348/333.03 |
| 8,264,596 B2 * | 9/2012 | Ueda et al. | 348/364 |
| 8,284,269 B2 * | 10/2012 | Kumagai et al. | 348/220.1 |
| 2008/0084484 A1 | 4/2008 | Ochi et al. | |
| 2010/0271531 A1 * | 10/2010 | Ueda et al. | 348/333.01 |
| 2010/0271532 A1 * | 10/2010 | Ueda et al. | 348/333.09 |
| 2011/0267528 A1 * | 11/2011 | Ueda et al. | 348/333.01 |

FOREIGN PATENT DOCUMENTS

| | | |
|---|---|---|
| JP | 2005-024843 A | 1/2005 |
| JP | 2008-096584 A | 4/2008 |
| JP | 2008-098808 A | 4/2008 |

* cited by examiner

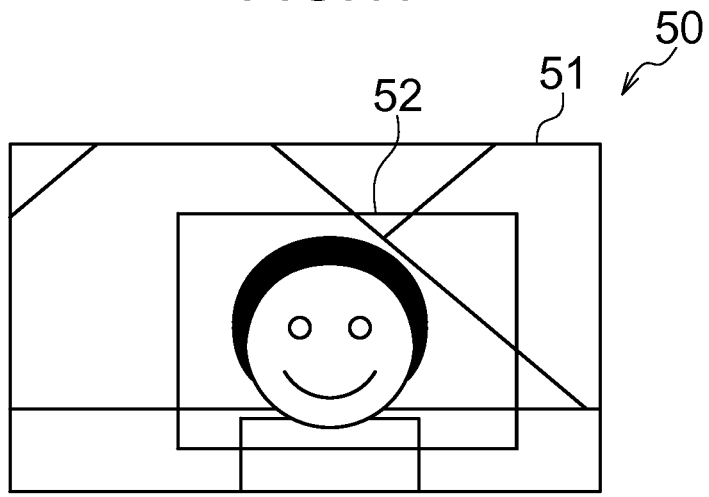
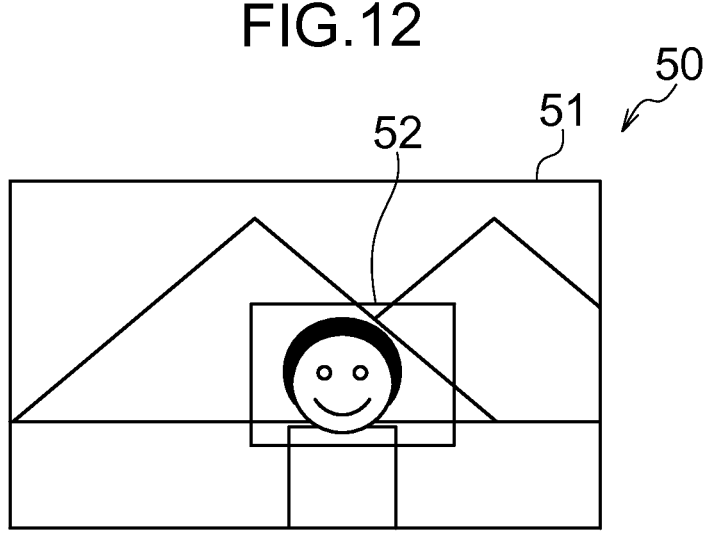

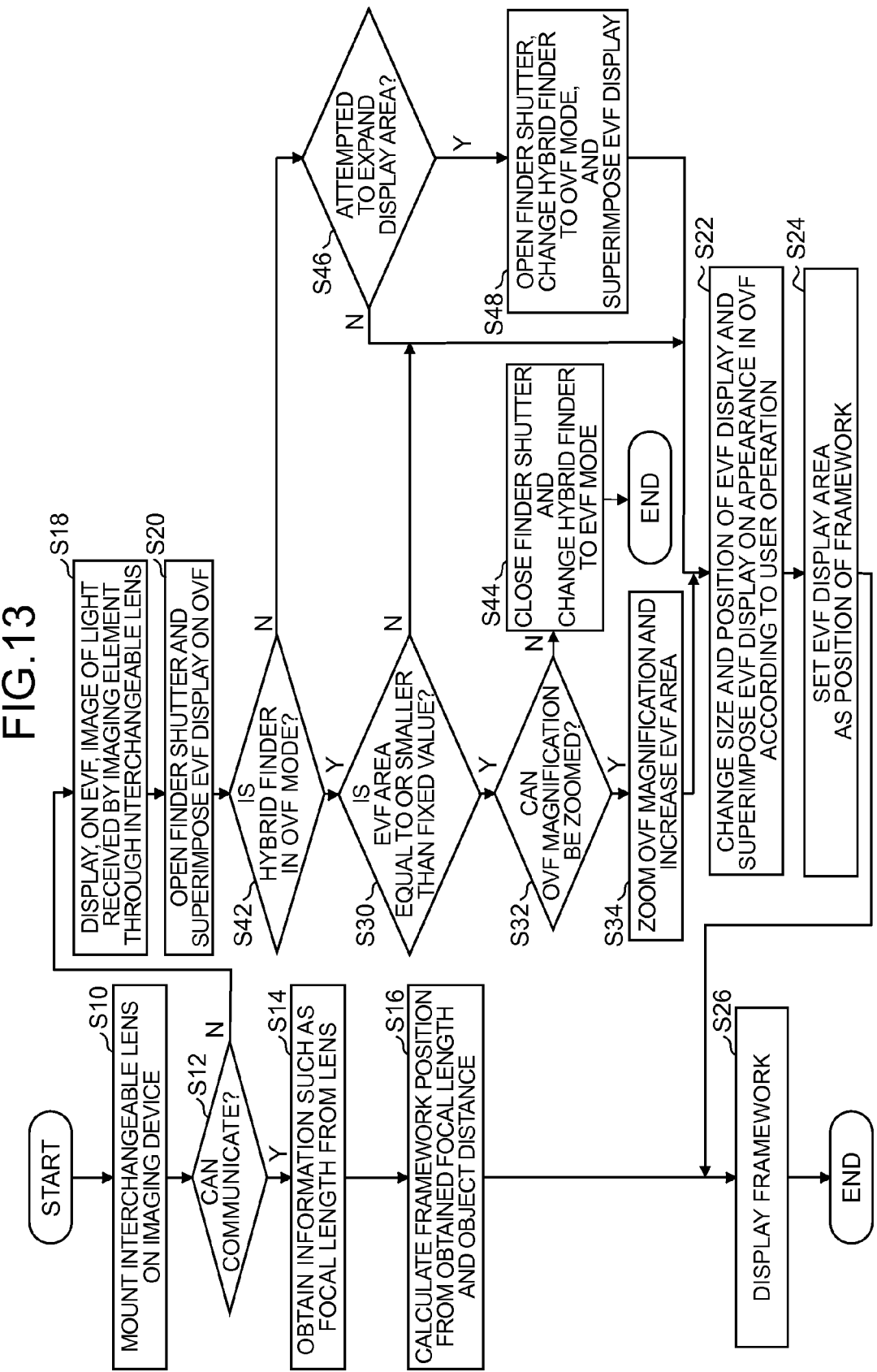

IMAGING DEVICE, IMAGING METHOD, AND A NON-TRANSITORY COMPUTER-READABLE RECORDING MEDIUM

CROSS-REFERENCE TO RELATED APPLICATIONS

This application is a continuation application and claims the priority benefit under 35 U.S.C. §120 of PCT Application No. PCT/JP2012/074490 filed on Sep. 25, 2012 which application designates the U.S., and also claims the priority benefit under 35 U.S.C. §119 of Japanese Patent Application No. 2011-218565 filed on Sep. 30, 2011, which applications are all hereby incorporated by reference in their entireties.

BACKGROUND OF THE INVENTION

1. Field of the Invention

The present invention relates to an imaging device, an imaging method, and a program and, more particularly, to an imaging device including a finder optical system separately from an imaging optical system, an imaging method, and a program.

2. Description of the Related Art

Japanese Patent Application Laid-Open No. 2008-96584 (hereinafter referred to as PTL 1) discloses a lens interchangeable electronic camera that displays, on a monitor in a finder, an object image (a visual field check image) taken via a finder optical system and superimposes and displays, on the visual field check image, using an on-screen function, a frame indicating a range of an angle of view taken by an imaging element for imaging (an imaging range).

SUMMARY OF THE INVENTION

However, the invention described in PTL 1 has a problem in that, when it is impossible to communicate with an interchangeable lens, since a focal length and the like of the lens cannot be acquired, the frame indicating the imaging range cannot be displayed. The invention described in PTL 1 displays the visual field check image as an electronic image. However, since there is a time lag between the imaging and the display and an optical image is clearer than the electronic image, it is desired to use an optical finder.

The present invention has been devised in view of such circumstances and it is an object of the present invention to provide an imaging device, an imaging method, and a program that can display a frame indicating an imaging range of an optical image of an optical finder even when it is impossible to communicate with an interchangeable lens attached to a camera main body.

In order to attain the object, an imaging device according to an aspect of the present invention includes: a camera mount on which an interchangeable lens is mounted; an imaging element configured to generate an image signal corresponding to an object light passed through the interchangeable lens; an optical finder capable of observing an optical image of an object; an electronic viewfinder capable of superimposing and displaying an image on the optical image; a lens information acquiring unit for acquiring information concerning the interchangeable lens mounted on the camera mount; and a first display control unit for causing the electronic viewfinder to display a taken image based on the image signal when the lens information acquiring unit cannot acquire the information concerning the interchangeable lens.

With the imaging device according to the aspect of the present invention, when the information concerning the interchangeable lens cannot be acquired, the taken image based on the image signal generated by the imaging element is displayed on the electronic viewfinder. Consequently, it is possible to check the taken image even when an interchangeable lens with which the imaging device cannot communicate is mounted.

The imaging device according to another aspect of the present invention may include: a moving unit for moving a superimposition position on the optical image of the taken image displayed on the electronic viewfinder by the first display control unit; a position determining unit for determining a position of the taken image on the basis of the position of the taken image moved by the moving unit; and a display control unit for causing the electronic viewfinder to display, in the position determined by the position determining unit, an imaging range image with which an imaging range can be identified on the optical image. Consequently, even when an interchangeable lens with which the imaging device cannot communicate is mounted, it is possible to check a range of the taken image on the optical image of the optical finder.

In the imaging device according to another aspect of the present invention, the optical finder may include a finder magnification changing unit for changing a magnification of the optical image. Consequently, it is possible to check a range of the taken image in a visual field suitable for imaging.

The imaging device according to another aspect of the present invention may include a storing unit for storing the position of the imaging range image. Consequently, when the same interchangeable lens is used again, it is possible to check the imaging range simply by reading out stored content without performing setting again.

The imaging device according to another aspect of the present invention may include a determining unit for determining whether the position of the imaging range image is stored in the storing unit. When the determining unit determines that the position of the imaging range image is stored, the first display control unit may cause the electronic viewfinder to display the imaging range image in the position stored in the storing unit instead of causing the electronic viewfinder to display the taken image. Consequently, even when an interchangeable lens with which the imaging device cannot communicate is mounted, it is possible to check the range of the taken image on the optical image of the optical finder.

The imaging device according to another aspect of the present invention may include: an input unit for receiving an input of a change in the position and the size of the taken image displayed on the electronic viewfinder; and an imaging range determining unit for determining, on the basis of the position and the size, the change of which is input by the input unit, a range in which the object is imaged. Consequently, even if the sizes of the interchangeable lens and the imaging element do not match and vignetting occurs, it is possible to take an image without the vignetting.

In the imaging device according to another aspect of the present invention, the first display control unit may display, as a new taken image, an image in the range determined by the imaging range determining unit in the taken image.

In the imaging device according to another aspect of the present invention, the interchangeable lens may include a zoom lens and a focus lens. The lens information acquiring unit may acquire position information of the zoom lens and the focus lens in the interchangeable lens mounted on the camera mount. The imaging device may include a calculating unit for calculating, when the position information of the zoom lens and the focus lens is acquired, a position and a size of the imaging range image on the basis of the position information of the zoom lens and the focus lens. Consequently, when the imaging device can communicate with the interchangeable lens, it is possible to automatically display a framework.

The imaging device according to another aspect of the present invention may include: a finder shutter configured to block the optical image to disable observation of the optical image; and a shutter control unit for blocking the optical image with the finder shutter when the taken image is displayed on the electronic viewfinder by the first display control unit. Consequently, it is possible to check only the electronic image displayed on the electronic viewfinder.

An imaging method according to another aspect of the present invention includes: a step of imaging, on an imaging element, object light passed through an interchangeable lens mounted via a camera mount; a step of acquiring information concerning the interchangeable lens mounted on the camera mount; and a step of causing, when the information concerning the interchangeable lens cannot be acquired, an electronic viewfinder superimposed and displayed on an optical image of an optical finder to display a taken image based on an image signal generated by the imaging element.

A non-transitory computer-readable medium having a program according to another aspect of the present invention causes an arithmetic unit to execute: a step of imaging, on an imaging element, object light passed through an interchangeable lens mounted via a camera mount; a step of acquiring information concerning the interchangeable lens mounted on the camera mount; and a step of causing, when the information concerning the interchangeable lens cannot be acquired, an electronic viewfinder superimposed and displayed on an optical image of an optical finder to display a taken image based on an image signal generated by the imaging element.

According to the present invention, even when it is impossible to communicate with an interchangeable lens attached to a camera main body, it is possible to display a frame indicating an imaging range on an optical image of the optical finder.

BRIEF DESCRIPTION OF THE DRAWINGS

FIG. 11 is a diagram showing an image of display of the hybrid finder.

FIG. 12 is a diagram showing an image of display of the hybrid finder.

FIG. 13 is a flowchart showing a flow of imaging preparation processing at the time when an interchangeable lens is attached in a third embodiment.

DETAILED DESCRIPTION OF THE PREFERRED EMBODIMENTS

Best forms for implementing an imaging device according to the present invention are explained in detail below with reference to the accompanying drawings.

First Embodiment

Explanation of the Configuration of an Imaging Device

Figure 1:
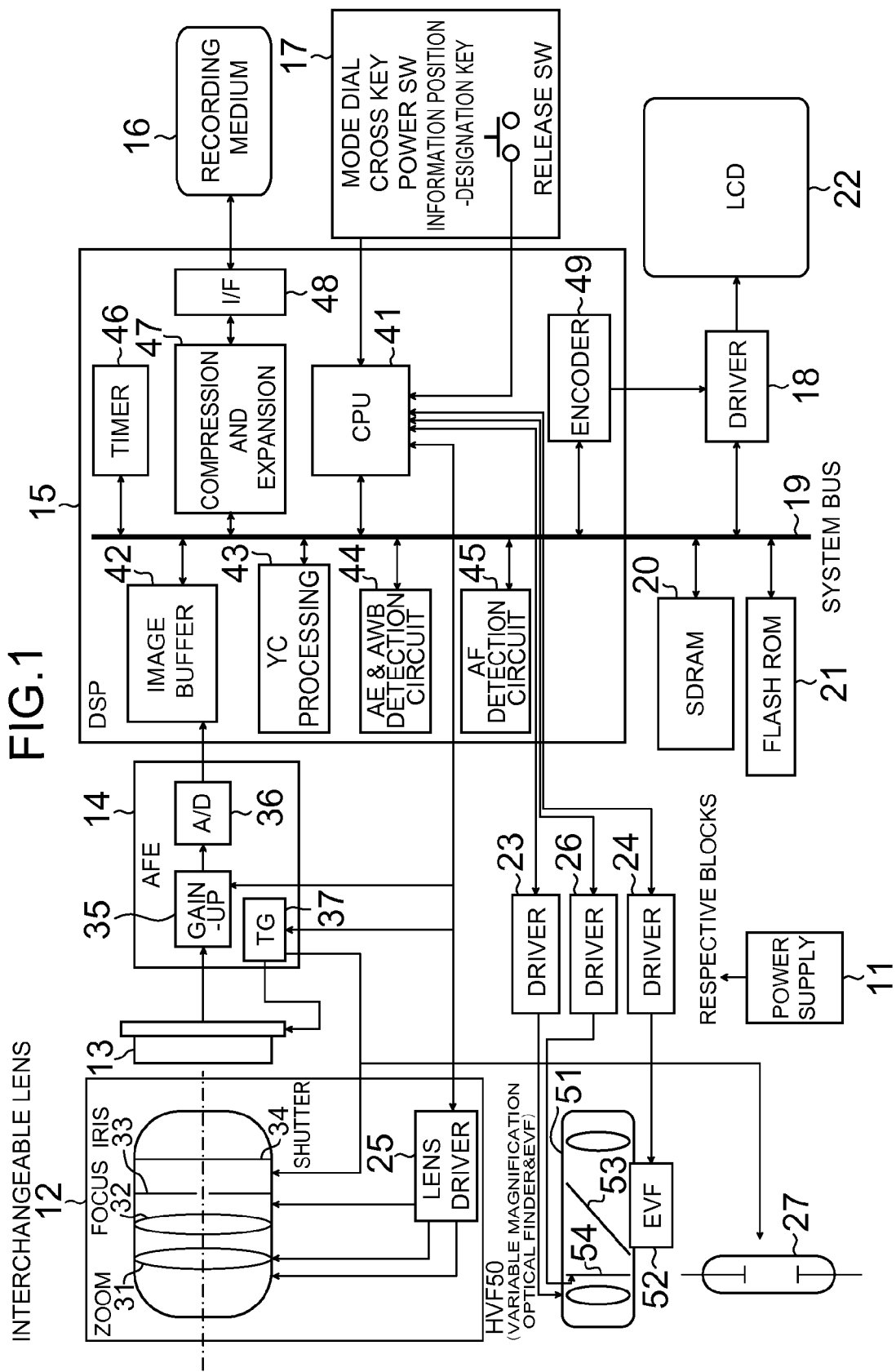
FIG. 1 is a block diagram of a digital camera 1.

FIG. 1 is a block diagram showing an example of the internal configuration of a digital camera 1. This digital camera 1 is a digital camera that receives, with an imaging element, light passed through a lens, converts the light into a digital signal, and records the digital signal in a storage medium. The operation of the entire device is collectively controlled by a central processing unit (CPU) 41.

As shown in FIG. 1, the digital camera 1 includes, besides a power supply 11, an imaging element 13, an AFE (Analog Front End) 14, a DSP (Digital Signal Processor) 15, a recording medium 16, an operation section 17, an LCD driver 18, a system bus 19, an SDRAM 20, a flash ROM 21, a flash 27, an LCD 22, and a hybrid finder (HVF) 50, drivers 25, 26, and 24 connected to a serial I/O terminal of the DSP 15 and for driving an interchangeable lens 12, an optical finder 51, and an electronic viewfinder 52. Note that FIG. 1 illustrates that the interchangeable lens 12 is mounted on the digital camera 1. However, various kinds of interchangeable lenses can be mounted on the digital camera 1.

The power supply 11 includes a battery and a power supply control section not shown in the figure and performs power supply to the respective blocks of the digital camera 1. The respective blocks supplied with the electric power are controlled by the CPU 41 provided in the DSP 15 to operate. The CPU 41 executes a predetermined control program on the basis of an input from the operation section 17 to thereby control the respective units of the digital camera 1.

The operation section 17 includes a release switch, a mode dial, a reproduction button, a MENU/OK key, a cross key, a BACK key, and the like. A signal from the operation section 17 is input to the CPU 41. The CPU 41 controls the respective circuits of the digital camera 1 on the basis of the input image and performs, for example, lens driving control, diaphragm driving control, imaging operation control, image processing control, image data recording/reproduction control, display control for the LCD 22 for stereoscopic display, and the like.

The release switch is an operation button for inputting an instruction for an imaging start and is configured by a switch of a two-stage stroke type including an S1 switch that is turned on when half-pressed and an S2 switch that is turned on when full-pressed. The mode dial is selecting means for selecting a 2D imaging mode, a 3D imaging mode, an auto imaging mode, a manual imaging mode, scene positions for a person, a landscape, a night view, and the like, a macro mode, a moving image mode, and a parallax preference imaging mode according to the present invention.

The reproduction button is a button for switching an operation mode to a reproduction mode for causing the LCD 22 to display a taken and recorded still image or moving image of a stereoscopic image (3D image) or a plane image (2D image). The MENU/OK key is an operation key including both of a function of a menu button for performing a command for causing the LCD 22 to display a menu on a screen of the LCD 22 and a function of an OK button for commanding decision, execution, and the like of selected content. The cross key is an operation section for inputting indication of up, down, left, and right four directions and functions as a button (cursor moving operation means) for selecting an item from a menu screen and instructing selection of various setting items from respective menus. An up/down key of the cross key functions as a zoom switch during imaging or a reproduction zoom switch during a reproduction mode. A left/right key of the cross key functions as a frame advance (forward/backward advance) button during the reproduction mode. The BACK key is used for erasing of a desired target such as a selected item and cancellation of instruction content or, for example, when an operation state is returned to the immediately preceding operation state.

In the flash ROM 21, in addition to the control program executed by the CPU 41, various parameters necessary for control, pixel defect data of the imaging element 13, and the like are recorded. The CPU 41 reads out the control program recorded in the program ROM to the SDRAM 20 and successively executes the control program to control the respective sections of the digital camera 1. Note that this SDRAM 20 is used as an execution processing area for a program and is used as a temporary storage area for image data and the like and various work areas.

The interchangeable lens 12 is mechanically and electrically connected to a camera main body of the digital camera 1 via a not-shown camera mount. The interchangeable lens 12 is configured by a zoom lens 31, a focus lens 32, an iris 33, and a shutter 34 and respectively driven by the lens driver 25 on the basis of commands of the CPU 41. When the digital camera 1 cannot communicate with (cannot be electrically connected to) the interchangeable lens 12, a user manually drives the zoom lens 31, the focus lens 32, the iris 33, and the shutter 34 via a rotary ring (not shown in the figure) or the like.

The zoom lens 31 and the focus lens 32 move back and forth on the same optical axis and perform zooming and focusing.

The iris 33 controls an amount of light made incident on the imaging element 13 and performs control of shutter speed and exposure. The iris 33 consists of, for example, five diaphragm blades and is subjected to diaphragm control in six stages from an aperture value F1.4 to an aperture value F11 at an interval of 1 AV.

The shutter 34 operates to make object light passed through the zoom lens 31, the focus lens 32, and the iris 33 incident on the imaging element 13 for a predetermined time.

The imaging element 13 is arranged in a post stage of the shutter 34 and receives object light passed through the interchangeable lens 12. The imaging element 13 includes a light receiving surface on which a large number of light receiving elements are arrayed in a matrix shape as it is well known. The object light passed through the interchangeable lens 12 is imaged on the light receiving surface of the imaging element 13 and converted into an electric signal by the respective light receiving elements. Note that as the imaging element, image sensors such as a CMOS and a CCD are applicable.

The AFE 14 is configured by a gain-up unit 35, an A/D converter 36, and a timing generator 37. The imaging element 13 outputs charges accumulated in respective pixels line by line as a serial image signal in synchronization with a vertical transfer clock and a horizontal transfer clock supplied from the timing generator 37. The CPU 41 controls the timing generator 37 and controls the driving of the imaging element 13.

Note that a charge accumulation time (an exposure time) of the pixels is determined by an electronic shutter driving signal given from the timing generator 37. The CPU 41 instructs the timing generator 37 about the charge accumulation time.

The output of the image signal is started when the digital camera 1 is set in an imaging mode. That is, when the digital camera 1 is set in the imaging mode, in order to display a through image on the LCD 22, the output of the image signal is started. The output of the image signal for the through image is once stopped when an instruction for main imaging is performed. The output of the image signal for the through image is started again when the main imaging ends.

The image signal output from the imaging element 13 is an analog signal. This analog image signal is captured into the gain-up unit 35.

The gain-up unit 35 includes a correlated double sampling circuit (CDS) and an automatic gain control circuit (AGC). The CDS performs removal of noise included in the image signal. The AGC amplifies the image signal, from which the noise is removed, with a predetermined gain. The analog image signal subjected to required signal processing by the gain-up unit 35 is captured into the A/D converter 36.

The A/D converter 36 converts the captured analog image signal into a digital image signal having gradation width of predetermined bits. The image signal is so-called RAW data and has gradation values indicating concentrations of R, G, and B for each of pixels. The digital image signal is captured into the DSP 15.

The DSP 15 is configured by the CPU 41 explained above, an image buffer 42, a YC processing section 43, an AE/AWB detection circuit 44, an AF detection circuit 45, a timer 46, a compressing and expanding section 47, a recording medium interface 48, and a video encoder 49, and the like. These are connected to a system bus 19 and can transmit and receive information to one another via the system bus 19.

The image buffer 42 stores image signals for one frame captured from the A/D converter 36.

The AF detection circuit 45 captures image signals of R, G, and B stored in the image buffer 42 and calculates a focus evaluation value necessary for AF (Automatic Focus) control according to a command of the CPU 41. This AF detection circuit 45 includes a high-pass filter configured to allow only a high-frequency component of the G signal to pass, an absolute value processing unit, an AF area extracting unit configured to slice out a signal in a predetermined focus area (hereinafter referred to as AF area) set on a screen, and an integrating unit configured to integrate absolute value data in the AF area. The AF detection circuit 45 outputs the absolute value data in the AF area integrated by the integrating unit to the CPU 41 as a focus evaluation value. As a control system for a focus lens group based on the focus evaluation value, it is possible to use a system for searching for a position where the focus evaluation value is maximal and moving the focus lens 32 to the position and a mountain climbing system for moving the focus lens group in a direction in which the focus evaluation value increases and, when a point where the focus evaluation value starts to decrease is detected, setting the focus lens group in the position.

The AE/AWB detection circuit 44 captures the image signals of R, G, and B stored in the image buffer 42, integrates the G signal of the entire screen or integrates the G signal weighted differently in a screen center portion and a peripheral portion, and outputs an integrated value necessary for AE control of the G signal to the CPU 41. The CPU 41 calculates a luminance value from the integrated value and calculates an exposure value from the luminance value. The CPU 41 determines an aperture value and shutter speed from the exposure value according to a predetermined program diagram.

The AE/AWB detection circuit 44 divides one screen into a plurality of areas (e.g., 16×16) and calculates average integrated values by colors of the image signals of R, G, and B for each of the divided areas as physical quantities necessary for AWB control. The CPU 41 calculates ratios of R/G and B/G for each of the divided areas from the obtained integrated value of R, integrated value of B, and integrated value of G and performs light source type discrimination on the basis of, for example, distribution in a color space of R/G and B/G of calculated values of R/G and B/G. The CPU 41 determines gain values (white balance correction values) for R, G, and B signals of a white balance adjustment circuit according to a white balance adjustment value suitable for the discriminated light source type such that, for example, values of the ratios are about 1 (i.e., an integration ratio of RGB is R:G:B=1:1:1 on one screen). The AE/AWB detection circuit 44 applies a digital gain corresponding to the light source type to the image signals for one frame stored in the image buffer 42 to perform white balance adjustment and perform gamma (gradation characteristic) processing and sharpness processing to generate R, G, and B signals.

The YC processing section 43 applies predetermined signal processing to the image signals of the respective colors of R, G, and B captured in a point sequential manner and generates an image signal (a Y/C signal) including a luminance signal Y and color difference signals Cr and Cb. The Y/C signal is stored in the SDRAM 20.

The compressing and expanding section 47 applies compression processing of a predetermined format (e.g., JPEG) to the input Y/C signal according to a compression command from the CPU 41 and generates compressed image data. The compressing and expanding section 47 applies expansion processing of a predetermined format to the input compressed image data according to an expansion command from the CPU 41 and generates uncompressed image data.

The video encoder 49 controls display on the LCD 22 via the driver 18 according to a command from the CPU 41.

The LCD 22 can display a moving image (a through image) and use the moving image as an electronic viewfinder. The LCD 22 can also display a taken image before recording (a preview image), a reproduced image read out from the recording medium inserted in the camera, and the like. The LCD 22 displays, according to operation of the mode dial or the menu button, various menu screens in manually setting an operation mode of the camera, white balance, the number of pixels of an image, and sensitivity and displays a screen for a graphical user interface (GUI) capable of setting manual setting items according to the operation of the operation button 112.

The recording medium interface 48 controls reading of data from and writing of data in the recording medium 16 according to a command from the CPU 41. Note that the recording medium 16 may be a recording medium detachably attachable to a camera main body like a memory card or may be a recording medium incorporated in the camera main body. When the recording medium 16 is detachably attachable, a card slot is provided in the main body of the camera. The recording medium 16 is inserted into the card slot and used.

The timer 46 performs measurement of a timer time in a self timer mode and performs measurement of a repetition time of finder display processing (explained in detail below).

The hybrid finder 50 is mainly configured by the optical finder 51, the electronic viewfinder 52, a prism 53, and a finder shutter 54. An optical image of the optical finder 51 and an electronic image of the electronic viewfinder 52 can be visually recognized via one eyepiece section.

The optical finder 51 is a variable magnification finder capable of changing a magnification stepwise according to magnification variation of the interchangeable lens 12. The optical finder 51 mainly includes a finder optical system configured by an objective lens, an eyepiece, and a variable magnification lens provided between the objective lens and the eyepiece and disposed to be capable of advancing into and retracting from an optical path of the optical finder 51. The variable magnification lens is driven via the driver 23 according to an instruction of the CPU 41. When the position of the zoom lens 31 of the interchangeable lens 12 can be acquired, the CPU 41 moves the variable magnification lens according to the magnification of the zoom lens 31 such that an angle of view of an image taken by the imaging element 13 (a taken image) and an angle of view of the optical finder 51 substantially coincide with each other.

The electronic viewfinder 52 is, for example, a liquid crystal panel and used as display means for a taken image, a frame, and the like. Display of the electronic viewfinder 52 is guided to the eyepiece section of the optical finder 51 by the prism 53 disposed in the optical path of the optical finder 51.

The finder shutter 54 is, for example, a liquid crystal shutter and disposed further on the objective lens side than the prism 53 in the optical path of the optical finder 51. When the finder shutter 54 closes, an optical image is not displayed on the hybrid finder 50. Only an electronic image of the electronic viewfinder 52 can be visually recognized.

[Explanation of the Operation of the Imaging Device]

Next, the operation of the digital camera 1 is explained. This imaging processing is controlled by the CPU 41. A program for causing the CPU 41 to execute this imaging processing is stored in a program storing unit configured by a non-transitory computer-readable recording medium (a RAM, a ROM, a memory card, etc.) present inside or outside the digital camera 1.

Figure 2:
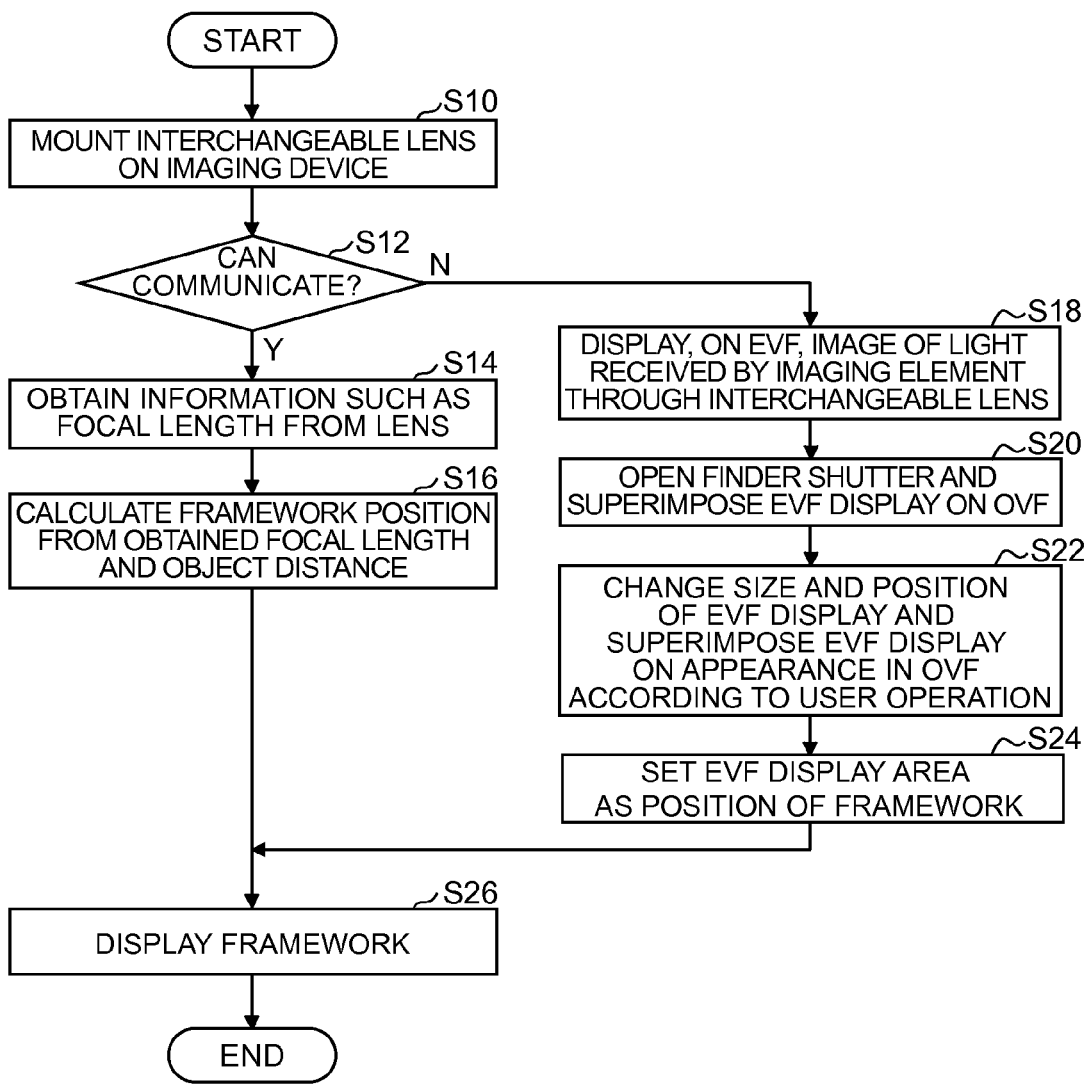
FIG. 2 is a flowchart showing a flow of imaging preparation processing at the time when an interchangeable lens is attached in a first embodiment.

FIG. 2 is a flowchart showing a flow of processing at an imaging preparation stage when an interchangeable lens is attached to the digital camera 1. This processing is mainly performed by the CPU 41.

The interchangeable lens is attached to the camera main body of the digital camera 1 (step S10). Object light passed through the interchangeable lens is imaged on a light receiving surface of the imaging element 13 via a diaphragm 14. Signal charges accumulated in main pixels and sub-pixels of the imaging element 13 are sequentially read out by the timing generator 37 as voltage signals (image signals) corresponding to the signal charges at a predetermined frame rate.

Image data are sequentially generated. The generated image data are sequentially input to the SDRAM 20. The CPU 41 changes an opening amount (an F value) of the diaphragm 14 on the basis of the image data.

The CPU 41 determines whether the digital camera 1 can communicate with the interchangeable lens, that is, whether the interchangeable lens is electrically connected to the digital camera 1 (step S12).

When the interchangeable lens is electrically connected (YES in step S12), the CPU 41 acquires position information of the zoom lens 31 and the focus lens 32 of the interchangeable lens, that is, a focal length of the interchangeable lens and an object distance (step S14). The CPU 41 calculates, on the basis of the focal length of the interchangeable lens and the object distance, the magnification of the optical finder 51, and positional relation between the optical finder 51 and an optical axis of the interchangeable lens, a position and a size of a framework, which is a frame indicating a range of an object image taken by the imaging element 13 (an imaging range) (step S16). It is desirable that, when the positions of the zoom lens 31 and the focus lens 32 of the interchangeable lens are changed, the CPU 41 acquires the focal length of the interchangeable lens and the object distance and calculates a position and a size of the framework again.

Figure 3:
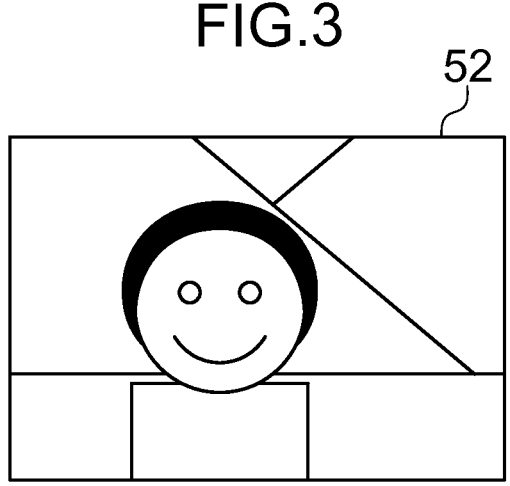
FIG. 3 is a diagram showing an image of display of an electronic viewfinder.

When the interchangeable lens is not electrically connected (NO in step S12), since the CPU 41 cannot understand where the framework should be displayed, an adjustment mode by user operation is set (steps S18 to S24). That is, as shown in FIG. 3, the CPU 41 causes the electronic viewfinder 52 to display an image taken by the imaging element 13 (a taken image) (step S18). The CPU 41 causes the electronic viewfinder 52 to continuously display sequentially-generated image data.

Figure 4:
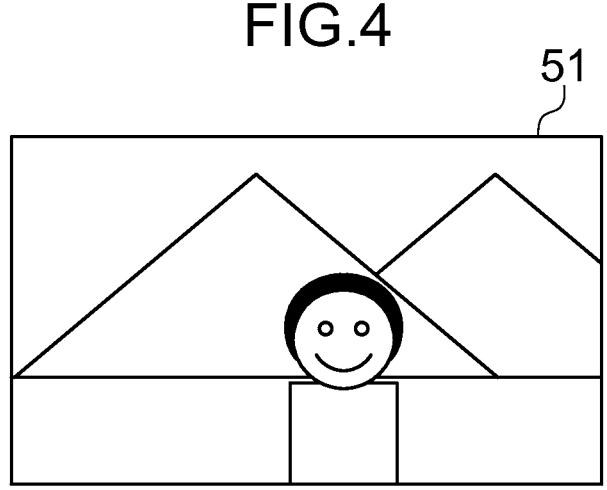
FIG. 4 is a diagram showing an image of display of an optical finder.
Figure 5:
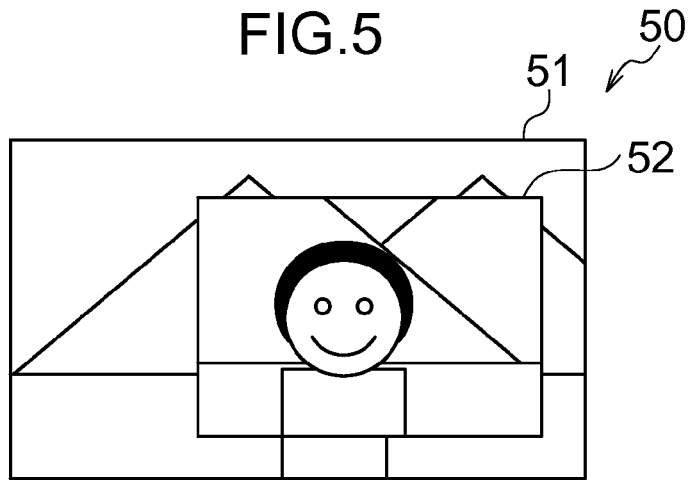
FIG. 5 is a diagram showing an image of display of a hybrid finder.

The CCD 41 opens the finder shutter 54 via the driver 26 and, as shown in FIG. 4, causes the optical finder 51 to display an optical image (step S20). As a result, as shown in FIG. 5, on the hybrid finder 50, an electronic image is superimposed and displayed on the optical image. Note that, in FIG. 5, the appearance of the optical finder 51 and a contour line of display content of the electronic viewfinder 52 are not connected. In order to make it easy to perform processing later, the CPU 41 may apply processing such as edge enhancement to the taken image displayed on the electronic viewfinder 52.

Figure 6:
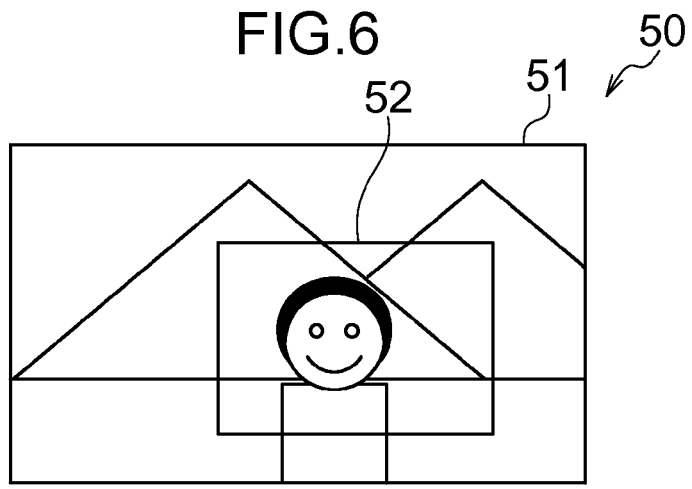
FIG. 6 is a diagram showing an image of display of the hybrid finder.

The user inputs an instruction for up, down, left, and right four directions and an instruction for a change (enlargement or reduction) of a size using the cross key of the operation section 17 such that the image displayed on the electronic viewfinder 52 coincides with the optical image of the optical finder 51. When the instructions are input, the CPU 41 detects the instructions and changes the position and the size of the taken image displayed on the electronic viewfinder 52 according to the input by the cross key (step S22). FIG. 6 is a diagram in which the position and the size of the taken image are changed from the state shown in FIG. 5. In FIG. 6, the appearance of the optical finder 51 and the contour line of the display content of the electronic viewfinder 52 are connected without a sense of discomfort.

The CPU 41 sets, as the position and the size of the framework, a range of the taken image, the position and the size of which are changed in step S22 (step S24).

Figure 7:
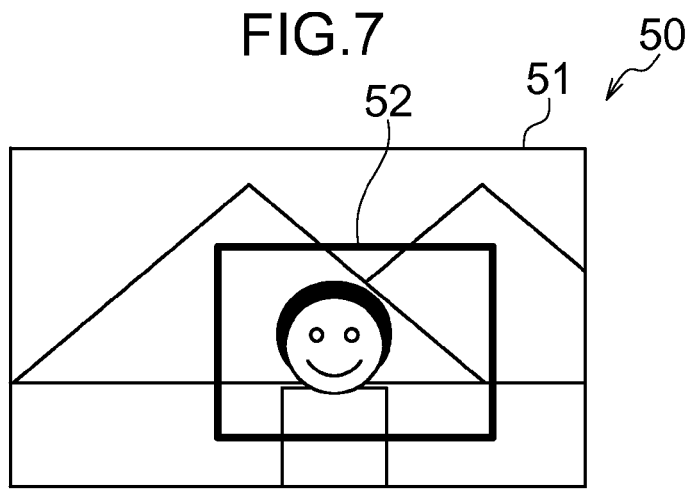
FIG. 7 is a diagram showing an image of display of the hybrid finder.

The CPU 41 causes the electronic viewfinder 52 to display the framework in the position and the size of the framework calculated in step S16 or the position and the size of the framework determined in step S24 (step S26). Consequently, as shown in FIG. 7, the framework is superimposed and displayed on the optical image of the optical finder 51.

Consequently, the imaging preparation is finished. The processing shown in FIG. 2 may be periodically performed at a predetermined interval or the user may perform the processing by instructing the processing via the operation section 17 when the user moves the zoom lens 31 and the focus lens 32. The CPU 41 moves the zoom lens 31 along the optical axis via the driver 25 and performs zooming according to an input from the operation section 17 while looking at the framework.

When the release switch is half-pressed, the S1 ON signal is input to the CPU 41. The CPU 41 carries out AE/AF/AWB operations via the AF detection circuit 45 and the AE/AWB detection circuit 44.

When the release switch is fully pressed, an S2 ON signal is input to the CPU 41. The CPU 41 starts imaging and recording processing. That is, the CPU 41 exposes the imaging element 13 at shutter speed and an aperture value determined on the basis of a photometry result.

Image data output from the imaging element 13 is captured into the YC processing section 43 via the AFE 14 and an image signal (a Y/C signal) is generated. The image signal is stored in the SDRAM 20 after being compressed according to a predetermined compression format (e.g., a JPEG format) by the compressing and expanding section 47.

A JPEG file is generated from the compressed data stored in the SDRAM 20. The JPEG file is recorded in the recording medium 16 via the recording medium interface 48. Consequently, an image is taken and recorded.

The image recorded in the recording medium 16 as explained above can be reproduced and displayed on the LCD 22 by setting the mode of the digital camera 1 to the reproduction mode with the reproduction button.

When the mode is set to the reproduction mode, the CPU 41 outputs a command to the recording medium interface 48 and causes the recording medium interface 48 to read out an image file recorded last in the recording medium 16.

Compressed image data of the read-out image file is added to the compressing and expanding section 47 and output to the LCD 22 via the video encoder 49 after being expanded to an uncompressed luminance/color difference signal.

Frame advance of an image is performed by the left and right key operation of the cross key. When the right key of the cross key is pressed, the next image file is read out from the recording medium 16 and reproduced and displayed on the LCD 22. When the left key of the cross key is pressed, the immediately preceding image file is read out from the recording medium 16 and reproduced and displayed on the LCD 22.

According to this embodiment, even when an interchangeable lens with which the digital camera 1 cannot communicate is mounted, it is possible to superimpose and display a framework matching the interchangeable lens on the optical finder only by performing simple adjustment.

Note that, in this embodiment, camera shake correcting function is not provided in the imaging lens or the imaging element. However, when the camera shake correcting function is provided, it is desirable to turn off the camera shake correcting function.

In this embodiment, the framework is displayed as the image indicating the imaging range. However, the image is not limited to the framework as long as the imaging range can be identified. For example, a mark indicating an expansion point of an area of the imaging range may be displayed or translucent masking of an area other than the imaging range may be displayed.

Second Embodiment

In the first embodiment of the present invention, the magnification of the optical finder and the electronic viewfinder (hereinafter referred to as finder magnification) is not changed. However, in some case, it is more appropriate to change the finder magnification.

A second embodiment of the present invention is a form for changing the finder magnification according to necessity. A digital camera 1-1 according to the second embodiment is explained below. Note that explanation is omitted concerning portions same as the portions in the first embodiment.

Figure 8:
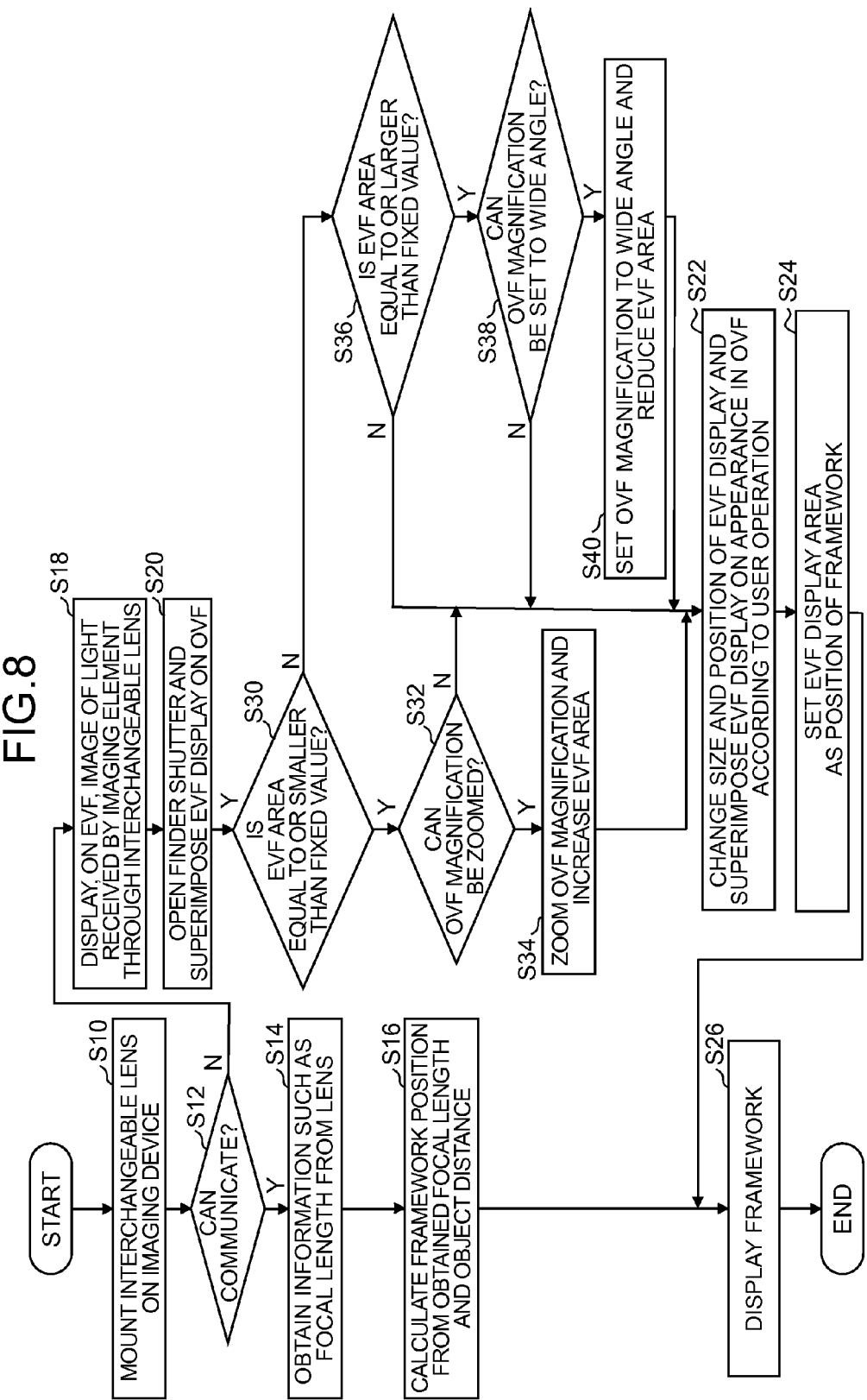
FIG. 8 is a flowchart showing a flow of imaging preparation processing at the time when an interchangeable lens is attached in a second embodiment.

FIG. 8 is a flowchart showing a flow of processing at an imaging preparation stage when an interchangeable lens is attached to the digital camera 1. This processing is mainly performed by the CPU 41.

The interchangeable lens is attached to a camera main body of the digital camera 1 (step S10). The CPU 41 determines whether the digital camera 1-1 can communicate with the interchangeable lens, that is, whether the interchangeable lens is electrically connected to the digital camera 1-1 (step S12).

When the interchangeable lens is electrically connected (YES in step S12), the CPU 41 acquires position information of the zoom lens 31 and the focus lens 32 of the interchangeable lens, that is, a focal length of the interchangeable lens and an object distance (step S14). The CPU 41 calculates, on the basis of the focal length of the interchangeable lens and the object distance, the magnification of the optical finder 51, and positional relation between the optical finder 51 and an optical axis of the interchangeable lens, a position and a size of a framework, which is a frame indicating a range of an object image taken by the imaging element 13 (an imaging range) (step S16).

Figure 9:
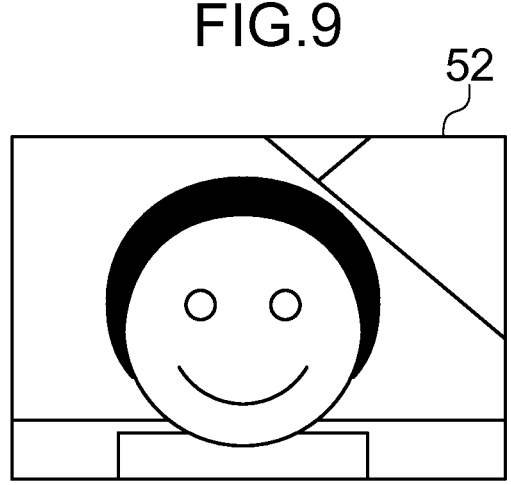
FIG. 9 is a diagram showing an image of display of an electronic viewfinder.
Figure 10:
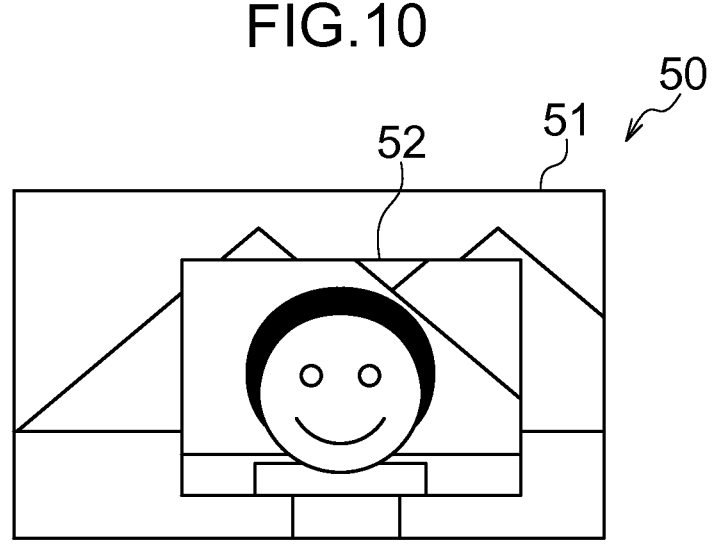
FIG. 10 is a diagram showing an image of display of a hybrid finder.

When the interchangeable lens is not electrically connected (NO in step S12), since the CPU 41 cannot understand where the framework should be displayed, an adjustment mode by user operation is set. The CPU 41 causes the electronic viewfinder 52 to display an image taken by the imaging element 13 (a taken image) (step S18). The CCD 41 opens the finder shutter 54 via the driver 26 and causes the optical finder 51 to display an optical image (step S20). In this embodiment, since a taken image shown in FIG. 9 is superimposed and displayed on the optical image shown in FIG. 4, the hybrid finder 50 is displayed as shown in FIG. 10.

The CPU 41 determines whether a ratio of the taken image displayed on the electronic viewfinder 52 to the optical image of the optical finder 51 is equal to or smaller than a fixed value (step S30). When the ratio of the taken image displayed on the electronic viewfinder 52 to the optical image of the optical finder 51 is equal to or smaller than the fixed value (YES in step S30), the CPU 41 determines whether the optical finder 51 can be zoomed, that is, whether the finder magnification of the optical finder 51 can be increased (step S32).

When the optical finder 51 can be zoomed (YES in step S32), as shown in FIG. 11, the CPU 41 zooms the optical finder 51 and increases the finder magnification of the optical finder 51 (step S34). In step S34, the CPU 41 may automatically increase the finder magnification to a predetermined magnification or may change the finder magnification of the optical finder 51 on the basis of an instruction of the user from the operation section 17 such that the size of the optical image coincides with the size of the taken image. Consequently, the hybrid finder 50 has a visual field suitable for imaging.

When the ratio of the taken image displayed on the electronic viewfinder 52 to the optical image of the optical finder 51 is not equal to or smaller than the fixed value (NO in step S30), the CPU 41 determines whether the ratio of the taken image displayed on the electronic viewfinder 52 to the optical image of the optical finder 51 is equal to or larger than the fixed value (step S36).

When the ratio of the taken image displayed on the electronic viewfinder 52 to the optical image of the optical finder 51 is equal to or larger than the fixed value (YES in step S36), the CPU 41 determines whether the optical finder 51 can be set on a wide angle side (step S38).

When the optical finder 51 can be set on the wide angle side (YES in step S38), as shown in FIG. 12, the CPU 41 sets the optical finder 51 on the wide angle side, that is, reduces the finder magnification of the optical finder 51 (step S40). In step S40, the CPU 41 may automatically reduce the finder magnification to the predetermined magnification or may change the finder magnification of the optical finder 51 on the basis of an instruction of the user from the operation section 17 such that the size of the optical image coincides with the size of the taken image. Consequently, the hybrid finder 50 has a visual field suitable for imaging.

When the finder magnification of the optical finder is changed (steps S34 and S40), when the finder magnification is not changed (NO in steps S32 and S38), and when the area of the EVF is not equal to or smaller than the fixed value nor equal to or larger than the fixed value (No in step S36), the user inputs an instruction for the up, down, left, and right four directions and an instruction for a change (enlargement or reduction) in the size using the cross key of the operation section 17 such that the image displayed on the electronic viewfinder 52 coincides with the optical image of the optical finder 51. When the instructions are input, the CPU 41 detects the instructions and changes the position and the size of the taken image displayed on the electronic viewfinder 52 according to the input by the cross key (step S22).

The CPU 41 sets, as the position and the size of the framework, a range of the taken image, the position and the size of which are changed in step S22 (step S24).

The CPU 41 causes the electronic viewfinder 52 to display the framework in the position and the size of the framework calculated in step S16 or the position and the size of the framework determined in step S24 (step S26).

According to this embodiment, when the finder magnification of the optical finder is variable, even when an interchangeable lens with which the digital camera cannot communicate is mounted on the camera main body, it is possible to superimpose and display a framework matching the interchangeable lens on an optical image of a visual field suitable for the imaging area through simple adjustment.

Third Embodiment

The second embodiment of the present invention is a form for changing a finder magnification of the optical finder. However, it might be hard to see the optical finder depending on the finder magnification.

A third embodiment of the present invention is a form for switching an optical finder to an electronic viewfinder depending on a finder magnification. A digital camera 1-2 according to the third embodiment is explained below. Note that explanation is omitted concerning portions same as the portions in the first and second embodiments.

FIG. 13 is a flowchart showing a flow of processing at an imaging preparation stage when an interchangeable lens is attached to the digital camera 1. This processing is mainly performed by the CPU 41.

The interchangeable lens is attached to a camera main body of the digital camera 1 (step S10). The CPU 41 determines whether the digital camera 1 can communicate with the interchangeable lens, that is, whether the interchangeable lens is electrically connected to the digital camera 1 (step S12).

When the interchangeable lens is electrically connected (YES in step S12), the CPU 41 acquires position information of the zoom lens 31 and the focus lens 32 of the interchangeable lens, that is, a focal length of the interchangeable lens and an object distance (step S14). The CPU 41 calculates, on the basis of the focal length of the interchangeable lens and the object distance, the magnification of the optical finder 51, and positional relation between the optical finder 51 and an optical axis of the interchangeable lens, a position and a size of a framework, which is a frame indicating a range of an object image taken by the imaging element 13 (an imaging range) (step S16).

When the interchangeable lens is not electrically connected (NO in step S12), since the CPU 41 cannot understand where the framework should be displayed, an adjustment mode by user operation is set. The CPU 41 causes the electronic viewfinder 52 to display an image taken by the imaging element 13 (a taken image) (step S18). The CCD 41 opens the finder shutter 54 via the driver 26 and causes the optical finder 51 to display an optical image (step S20).

The CPU 41 determines whether a mode of the digital camera 1-2 is an OVF mode in which an optical image can be visually recognized by the optical finder 51, that is, whether the finder shutter 54 is not closed (step S42). When the mode is the OVF mode (YES in step S42), the CPU 41 determines whether a ratio of the taken image displayed on the electronic viewfinder 52 to the optical image of the optical finder 51 is equal to or smaller than a fixed value (step S30). When the ratio of the taken image displayed on the electronic viewfinder 52 to the optical image of the optical finder 51 is equal to or smaller than the fixed value (YES in step S30), the CPU 41 determines whether the optical finder 51 can be zoomed, that is, whether the finder magnification of the optical finder 51 can be increased (step S32).

When the optical finder 51 can be zoomed (YES in step S32), the CPU 41 zooms the optical finder 51 and increases the finder magnification of the optical finder 51 (step S34).

When the optical finder 51 cannot be zoomed (NO in step S32), the CPU 41 closes the finder shutter 54, changes the hybrid finder 50 to an EVF mode in which only an image of the electronic viewfinder 52 can be visually recognized (step S44), and ends the processing.

When the mode is not the OVF mode (NO in step S42), that is, when the hybrid finder 50 is in the EVF mode, the CPU 41 determines whether it is attempted to expand a display area, that is, whether it is attempted to enlarge the taken image (step S46). When it is not attempted to enlarge the taken image (NO in step S46), the CPU 41 directly ends the processing in the EVF mode.

When it is attempted to enlarge the taken image (YES in step S46), the CPU 41 opens the finder shutter 54, changes the hybrid finder 50 to the OVF mode, displays the taken image on the electronic viewfinder 52, and superimposes and displays the taken image on the optical image (step S48).

When the area of the EVF is not equal to or smaller than the fixed value either (NO in step S30), when the finder magnification of the optical finder is changed (step S34), and when the hybrid finder 50 is changed to the OVF mode (step S48), the user inputs an instruction for the up, down, left, and right four directions and an instruction for a change (enlargement or reduction) in the size using the cross key of the operation section 17 such that the image displayed on the electronic viewfinder 52 coincides with the optical image of the optical finder 51. When the instructions are input, the CPU 41 detects the instructions and changes the position and the size of the taken image displayed on the electronic viewfinder 52 according to the input by the cross key (step S22).

The CPU 41 sets, as the position and the size of the framework, a range of the taken image, the position and the size of which are changed in step S22 (step S24).

The CPU 41 causes the electronic viewfinder 52 to display the framework in the position and the size of the framework calculated in step S16 or the position and the size of the framework determined in step S24 (step S26).

According to this embodiment, it is possible to solve, by changing the mode to the EVF mode, a problem in that, when the optical magnification of the interchangeable lens is high, an area is too small even if the framework is displayed on the optical finder and it is sometimes hard to see the imaging area.

Fourth Embodiment

The third embodiment of the present invention is a form for switching the optical finder to the electronic viewfinder when the optical finder cannot be zoomed. However, a form for switching the optical finder to the electronic viewfinder is not limited to this depending on the finder magnification.

A fourth embodiment of the present invention is a form for switching an optical finder to an electronic viewfinder when an optical finder cannot be set to a wide angle. A digital camera 1-3 according to the fourth embodiment is explained below. Note that explanation is omitted concerning portions same as the portions in the first, second, and third embodiments.

Figure 15:
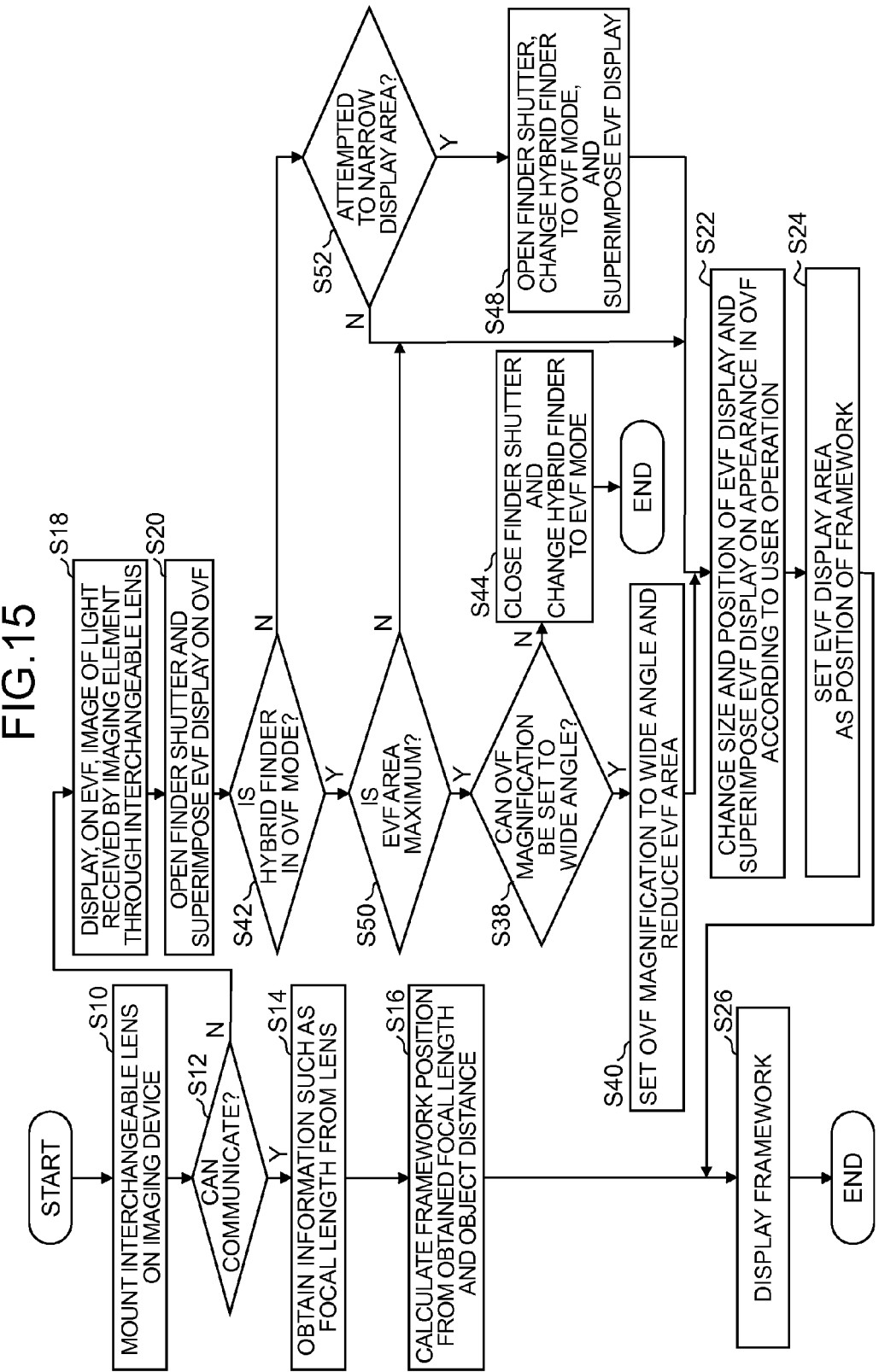
FIG. 15 is a flowchart showing a flow of imaging preparation processing at the time when an interchangeable lens is attached in a fourth embodiment.

FIG. 15 is a flowchart showing a flow of processing at an imaging preparation stage when an interchangeable lens is attached to the digital camera 1. This processing is mainly performed by the CPU 41.

The interchangeable lens is attached to a camera main body of the digital camera 1 (step S10). The CPU 41 determines whether the digital camera 1 can communicate with the interchangeable lens, that is, whether the interchangeable lens is electrically connected to the digital camera 1 (step S12).

When the interchangeable lens is electrically connected (YES in step S12), the CPU 41 acquires position information of the zoom lens 31 and the focus lens 32 of the interchangeable lens, that is, a focal length of the interchangeable lens and an object distance (step S14). The CPU 41 calculates, on the basis of the focal length of the interchangeable lens and the object distance, the magnification of the optical finder 51, and positional relation between the optical finder 51 and an optical axis of the interchangeable lens, a position and a size of a framework, which is a frame indicating a range of an object image taken by the imaging element 13 (an imaging range) (step S16).

When the interchangeable lens is not electrically connected (NO in step S12), since the CPU 41 cannot understand where the framework should be displayed, an adjustment mode by user operation is set. The CPU 41 causes the electronic viewfinder 52 to display an image taken by the imaging element 13 (a taken image) (step S18). The CCD 41 opens the finder shutter 54 via the driver 26 and causes the optical finder 51 to display an optical image (step S20).

The CPU 41 determines whether a mode of the digital camera 1-3 is an OVF mode in which an optical image can be visually recognized by the optical finder 51, that is, whether the finder shutter 54 is not closed (step S42). When the mode is the OVF mode (YES in step S42), the CPU 41 determines whether the taken image displayed on the electronic viewfinder 52 has a maximum size (step S50). When the taken image has the maximum size (YES in step S50), the CPU 41 determines whether the finder magnification of the optical finder 51 can be set to a wide angle (step S38).

When the finder magnification of the optical finder 51 can be set to the wide angle (YES in step S38), the CPU 41 sets the optical finder 51 on the wide angle side, that is, reduces the finder magnification of the optical finder 51 (step S40).

Figure 14:
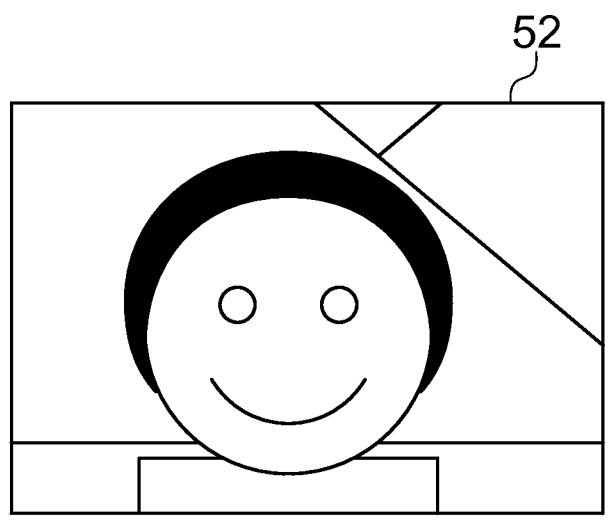
FIG. 14 is a diagram showing an image of display of a hybrid finder in an EVF mode.
Figure 16:
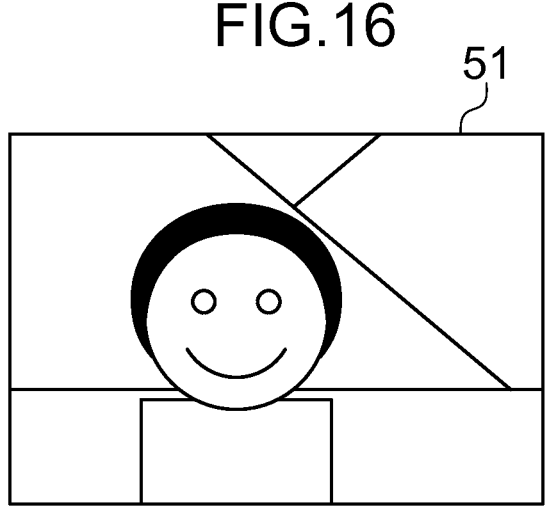
FIG. 16 is a diagram used for explanation of step S44.
Figure 17:
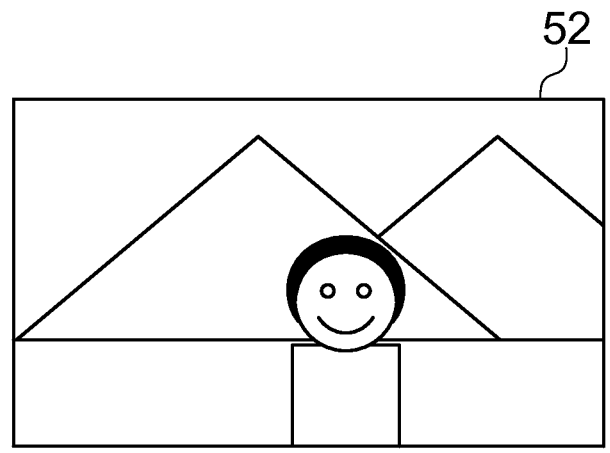
FIG. 17 is a diagram used for explanation of step S44.
Figure 18:
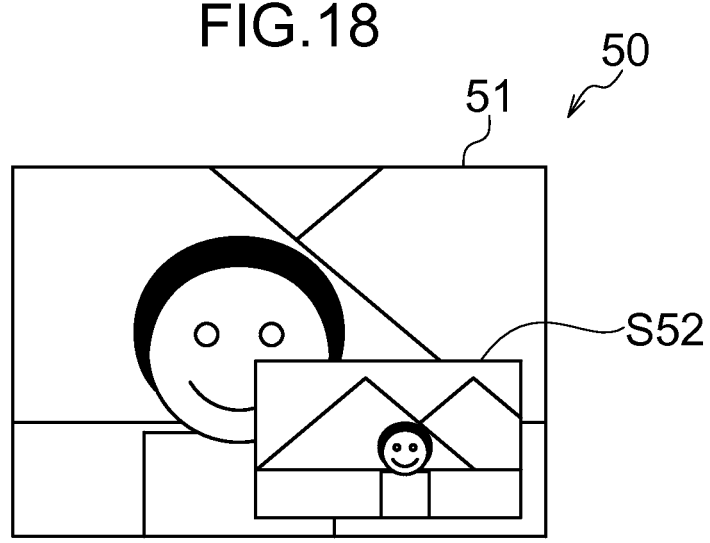
FIG. 18 is a diagram used for explanation of step S44.
Figure 19:
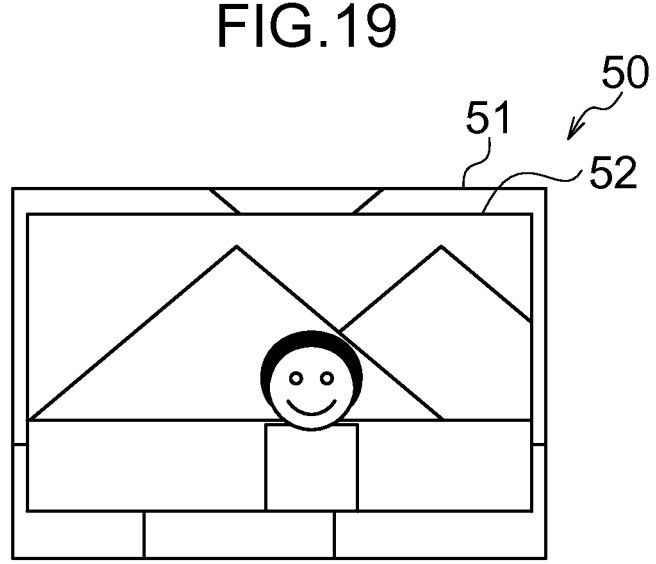
FIG. 19 is a diagram used for explanation of step S44.

When the finder magnification of the optical finder 51 cannot be set to the wide angle (NO in step S38), for example, an optical image shown in FIG. 16 has a wider angle than a taken image shown in FIG. 17. In such a case, display of the hybrid finder 50 is display shown in FIG. 18. In this case, as shown in FIG. 19, even if the taken image is set to the wide angle at the maximum, the taken image sometimes cannot be increased to a size substantially the same as the optical image. Therefore, the CPU 41 closes the finder shutter 54, changes the hybrid finder 50 to an EVF mode in which only the image of the electronic viewfinder 52 can be visually recognized as shown in FIG. 14 (step S44), and ends the processing.

When the mode is not the OVF mode (NO in step S42), the CPU 41 determines whether it is attempted to narrow a display area, that is, whether it is attempted to reduce the taken image (step S52). When it is not attempted to reduce the taken image (NO in step S52), the CPU 41 directly ends the processing in the EVF mode.

When it is attempted to reduce the taken image (YES in step S52), the CPU 41 opens the finder shutter 54, changes the hybrid finder 50 to the OVF mode, displays the taken image on the electronic viewfinder 52, and superimposes and displays the taken image on the optical image (step S48).

When the area of the EVF is not the maximum (NO in step S50), when the finder magnification of the optical finder is changed (step S40), and when the hybrid finder 50 is changed to the OVF mode (step S48), the user inputs an instruction for up, down, left, and right four directions and an instruction for a change (enlargement or reduction) of a size using the cross key of the operation section 17 such that the image displayed on the electronic viewfinder 52 coincides with the optical image of the optical finder 51. When the instructions are input, the CPU 41 detects the instructions and changes the position and the size of the taken image displayed on the electronic viewfinder 52 according to the input by the cross key (step S22).

The CPU 41 sets, as the position and the size of the framework, a range of the taken image, the position and the size of which are changed in step S22 (step S24).

The CPU 41 causes the electronic viewfinder 52 to display the framework in the position and the size of the framework calculated in step S16 or the position and the size of the framework determined in step S24 (step S26).

According to this embodiment, it is possible to solve, by changing the mode to the EVF mode, a problem in that, when the interchangeable lens has a wider angle than the optical finder, the imaging area cannot be entirely viewed with the optical finder.

Fifth Embodiment

In the first embodiment of the present invention, the framework matching the interchangeable lens is superimposed and displayed on the optical finder. However, it could occur that the interchangeable lens does not match the size of the imaging element.

A fifth embodiment of the present invention is a form for limiting a range of use of an imaging element and adjusting an angle of view when an interchangeable lens does not match the size of the imaging element. A digital camera 1-4 according to the fifth embodiment is explained below. Note that explanation is omitted concerning portions same as the portions in the first to fourth embodiments.

Figure 20:
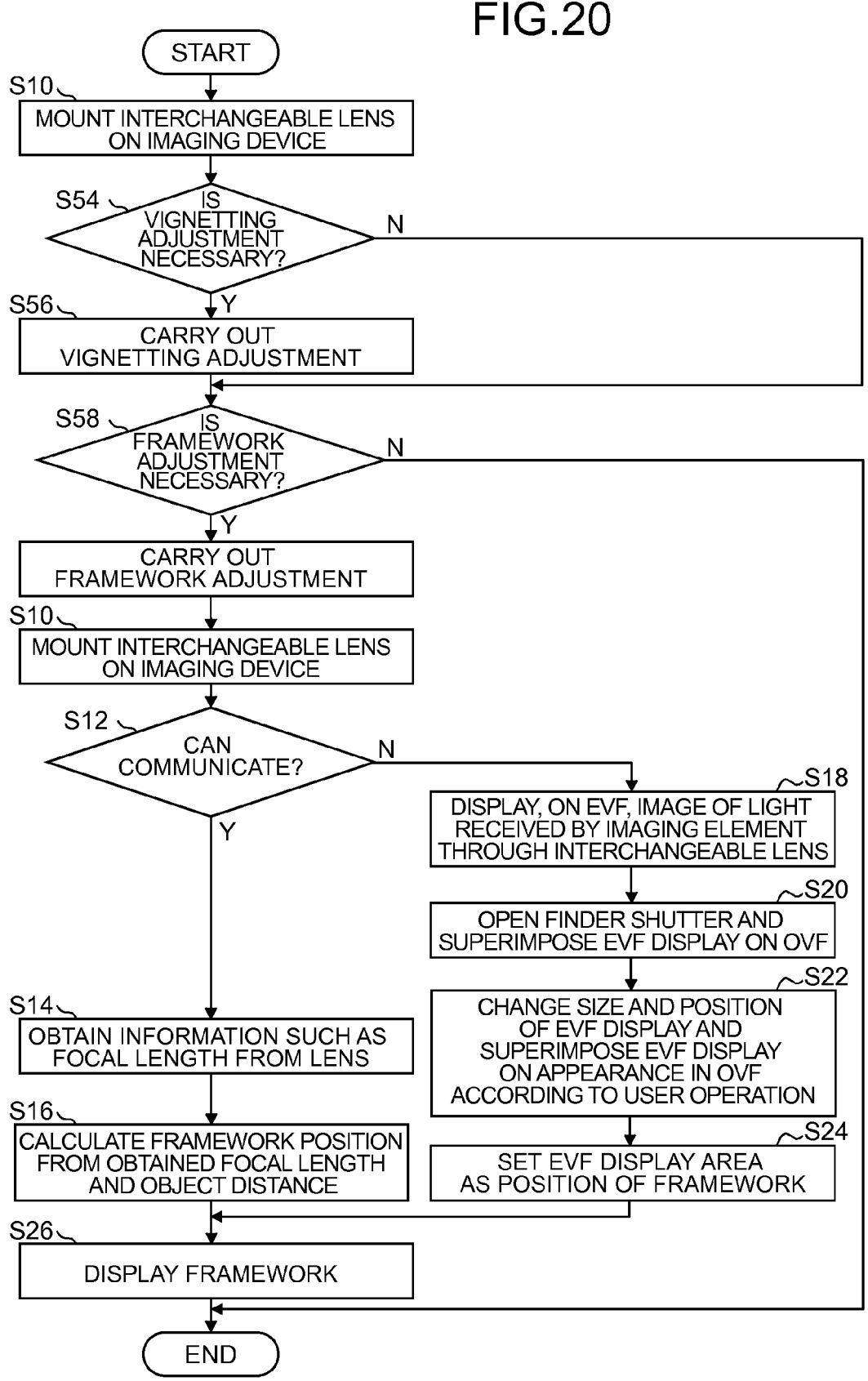
FIG. 20 is a flowchart showing a flow of imaging preparation processing at the time when an interchangeable lens is attached in a fifth embodiment.

FIG. 20 is a flowchart showing a flow of processing at an imaging preparation stage when an interchangeable lens is attached to the digital camera 1. This processing is mainly performed by the CPU 41.

Figure 21:
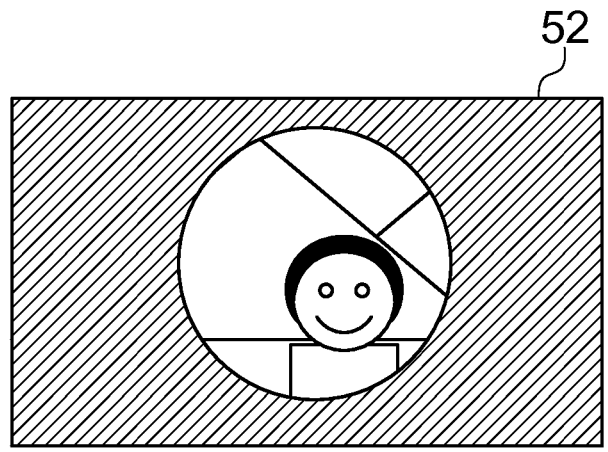
FIG. 21 is a diagram showing an image of display of an electronic viewfinder.

The interchangeable lens is attached to a camera main body of the digital camera 1 (step S10). The CPU 41 checks an image taken by the imaging element 13 (a taken image) and determines whether vignetting shown in FIG. 21 occurs (step S54). In FIG. 21, a peripheral black portion is a vignetted portion. The CPU 41 can automatically determine, by detecting a size and a shape of a black area, whether vignetting is present. For example, the CPU 41 can detect the black portion on the basis of an output value (e.g., an integrated value) of the imaging element 13 and determine presence or absence of vignetting according to whether a dark portion disappears when the taken image is electronically zoomed (a part of an area is enlarged) at the same aspect. The CPU 41 may display the taken image on the electronic viewfinder 52 or the LCD 22 and determine the presence or absence of vignetting on the basis of an instruction input by a user via the operation section 17.

Figure 22:
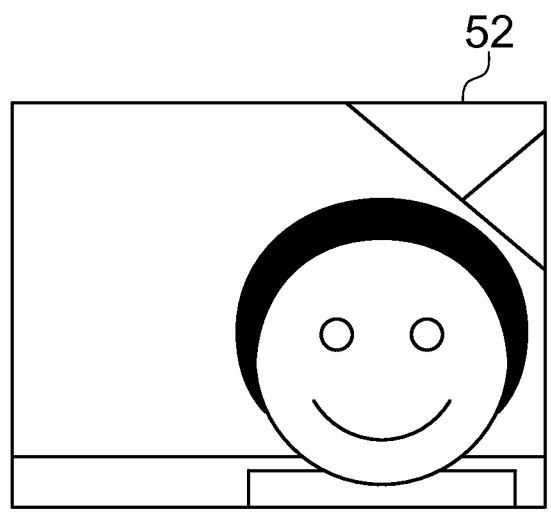
FIG. 22 is a diagram showing an image of display of the electronic viewfinder.

When vignetting occurs, as shown in FIG. 22, the CPU 41 performs vignetting adjustment for extracting an area having an aspect ratio same as the aspect ratio as the imaging element 13 within a light reception range of the imaging element 13 (step S56). The CPU 41 can automatically perform the vignetting adjustment by a method same as so-called electronic zoom. The CPU 41 may perform the vignetting adjustment by displaying the taken image on the electronic viewfinder 52 or the LCD 22 and setting, as a range in which an object is imaged, a position and a size input by the user via the operation section 17.

When the vignetting adjustment is unnecessary (NO in step S54) and when the vignetting adjustment ends (step S56), the CPU 41 determines whether adjustment of a framework is necessary (step S58). The CPU 41 may perform processing in this step on the basis of an instruction input by the user via the operation section 17. It is also possible that, first, the CPU 41 performs steps S30 and S32 and, when determining YES in these steps, after performing the processing in step S34, determines YES in step S58. It is also possible that, first, the CPU 41 performs steps S50 and S38 and, when determining YES in these steps, after performing the processing in step S40, determines YES in step S58.

When adjustment of the framework is necessary (YES in step S58), the CPU 41 performs the processing in steps S10 to S24, which is the adjustment processing for the framework (see FIG. 2). Since the processing in steps S10 to S24 is already explained, detailed explanation of the processing is omitted. Note that, in step S18, in the taken image acquired by the imaging element 13, the image in the range in which the object is imaged input in step S56 is displayed on the electronic viewfinder 52 as a new taken image.

According to this embodiment, even when the interchangeable lens does not match the size of the imaging element and vignetting occurs on the imaging element, it is possible to perform imaging at an angle of view suitable for the imaging by using a range without vignetting as an imaging area.

Sixth Embodiment

In the first embodiment of the present invention, the framework matching the interchangeable lens is superimposed and displayed on the optical finder. However, it is difficult to perform the same processing in second and subsequent times.

A sixth embodiment of the present invention is a form for storing, for each of interchangeable lenses, setting of a vignetting amount, a size and a position of a framework, a finder magnification, and the like and making it possible to immediately use the setting simply by reading out the setting during the next use. A digital camera 1-5 according to the sixth embodiment is explained below. Note that explanation is omitted concerning portions same as the portions in the first to fifth embodiments.

Figure 23:
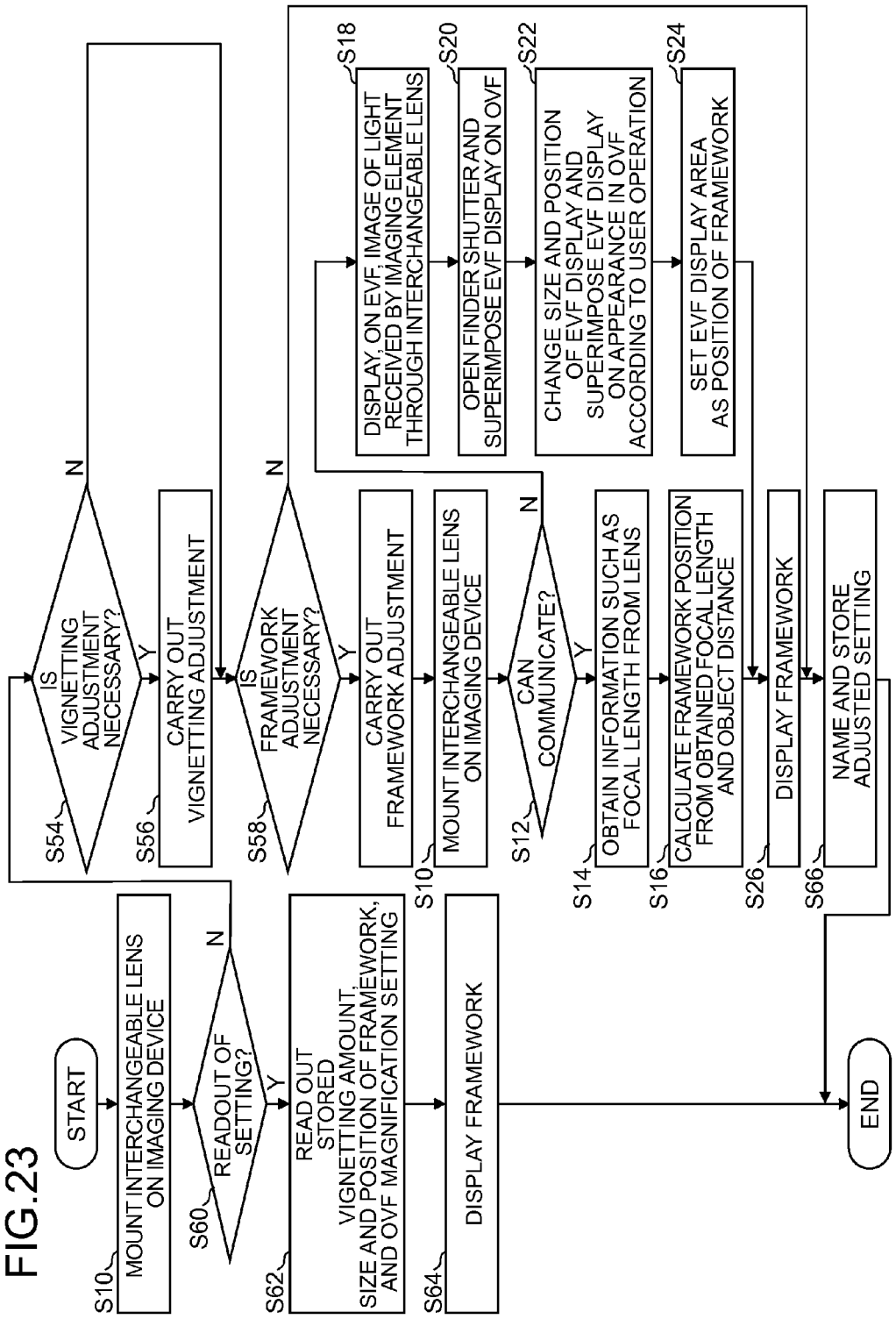
FIG. 23 is a flowchart showing a flow of imaging preparation processing at the time when an interchangeable lens is attached in a sixth embodiment.

FIG. 23 is a flowchart showing a flow of processing at an imaging preparation stage when an interchangeable lens is attached to the digital camera 1. This processing is mainly performed by the CPU 41.

The interchangeable lens is attached to a camera main body of the digital camera 1 (step S10). The CPU 41 determines whether setting concerning the interchangeable lens can be read out from the flash ROM 21 (step S60). When a user inputs a name or a number of the interchangeable lens via the operation section 17, the CPU 41 receives the name or the number of the interchangeable lens and determines whether setting concerning the name or the number of the interchangeable lens is stored in the flash ROM 21. Note that the setting concerning the interchangeable lens includes a vignetting amount (a result of the vignetting adjustment processing shown in FIG. 20), the size and the position of the framework, and the finder magnification of the optical finder 51 and is stored in association with the name or the number of the interchangeable lens.

When the setting can be read out (YES in step S60), the CPU 41 reads out the setting concerning the interchangeable lens from the flash ROM 21 (step S62) and displays the framework on the basis of the read-out setting (step S64).

When the setting cannot be read out (NO in step S60), the setting concerning the interchangeable lens is not stored in the flash ROM 21. The CPU 41 performs the vignetting adjustment processing (steps S54 to S58) and the framework adjustment proceeding (steps S12 to S26) shown in FIG. 20. Since these kinds of processing are already explained, explanation of the processing is omitted.

When the vignetting adjustment processing (steps S54 to S58) and the framework adjustment proceeding (steps S12 to S26) end, the CPU 41 stores the adjusted setting in the flash ROM 21 in association with the name or the number of the interchangeable lens (step S66). The CPU 41 may automatically give the name or the number of the interchangeable lens according to a predetermined rule. The user may input the name or the number of the interchangeable lens.

According to this embodiment, when an interchangeable lens is mounted for the first time, setting concerning the interchangeable lens is named and stored. This makes it possible to immediately use the setting simply by reading out the setting when the same interchangeable lens is mounted next time.

The embodiments of the present invention are explained above. However, the technical scope of the present invention is not limited to the scope described in the embodiments. It is evident for those skilled in the art that it is possible to add various alterations and improvements to the embodiments. It is evident from the description of claims that forms added with such alterations and improvements could also be included in the technical scope of the present invention.

It should be noted that the execution order of the respective kinds of processing such as the operations, the procedures, the steps, and the stages in the device, the system, the program, and the method described and shown in the claims, the specification, and the drawings is not particularly clearly indicated as "before", "prior to", or the like and, unless an output of preceding processing is used in following processing, the respective kinds of processing can be realized in arbitrary order. Even if the operation flows in the claims, the specification, and the drawings are explained using "first,", "next," and the like for convenience, this does not mean that it is essential to carry out the operation flows in this order.

What is claimed is:
1. An imaging device comprising:
   a camera mount on which an interchangeable lens is mounted;
   an imaging element configured to generate an image signal corresponding to an object light passed through the interchangeable lens;
   an optical finder capable of observing an optical image of an object which goes through an optical system different from the interchangeable lens;
   an electronic viewfinder capable of superimposing and displaying a taken image based on the image signal and the optical image;
   a lens information acquiring unit for communicating with the interchangeable lens mounted on the camera mount and acquiring information concerning the interchangeable lens;
   a communication determination unit configured to determine whether or not the interchangeable lens is communicable with the lens information acquiring unit; and
   a first display control unit for causing the electronic viewfinder to superimpose and display the taken image and the optical image if the communication determination unit determines that the interchangeable lens is not communicable with the lens information acquiring unit.

2. The imaging device according to claim 1, comprising:
   a moving unit for moving a superimposition position on the optical image of the taken image displayed on the electronic viewfinder by the first display control means;
   a position determining unit for determining a position of the taken image on the basis of a position of the taken image moved by the moving means; and
   a display control unit for causing the electronic viewfinder to display, in the position determined by the position determining unit, an imaging range image with which an imaging range can be identified on the optical image.

3. The imaging device according to claim 2, comprising a storing unit for storing a position of the imaging range image.

4. The imaging device according to claim 3, comprising a determining unit for determining whether the position of the imaging range image is stored in the storing unit, wherein
   when the determining unit determines that the position of the imaging range image is stored, the first display control unit causes the electronic viewfinder to display the imaging range image in the position stored in the storing unit instead of causing the electronic viewfinder to display the taken image.

5. The imaging device according to claim 2, wherein
   the interchangeable lens includes a zoom lens and a focus lens,
   the lens information acquiring unit acquires position information of the zoom lens and the focus lens in the interchangeable lens mounted on the camera mount, and
   the imaging device comprises calculating unit for calculating, when the position information of the zoom lens and the focus lens is acquired, a position and a size of the imaging range image on the basis of the position information of the zoom lens and the focus lens.

6. The imaging device according to claim 1, wherein the optical finder includes a finder magnification changing unit for changing a magnification of the optical image.

7. The imaging device according to claim 1, comprising:
an input unit for receiving an input of a change in a position and a size of the taken image displayed on the electronic viewfinder; and
an imaging range determining unit for determining, on the basis of the position and the size, the change of which is input by the input unit, a range in which the object is imaged.

8. The imaging device according to claim 7, wherein the first display control unit displays, as a new taken image, an image in the range determined by the imaging range determining unit in the taken image.

9. The imaging device according to claim 1, comprising:
a finder shutter configured to block the optical image to disable observation of the optical image; and
a shutter control unit for blocking the optical image with the finder shutter when the taken image is displayed on the electronic viewfinder by the first display control unit.

10. An imaging method comprising:
a step of imaging, on an imaging element, object light passed through an interchangeable lens mounted via a camera mount;
a step of acquiring information concerning the interchangeable lens mounted on the camera mount; and
a step of determining whether or not the interchangeable lens is communicable;
a step of causing an electronic viewfinder to superimpose and display an optical image of an object which goes through an optical system different from the interchangeable lens and a taken image based on an image signal generated by the imaging element if it is determined that the interchangeable lens is not communicable.

11. A non-transitory computer-readable recording medium having recorded therein a program for causing an arithmetic unit to execute:
a step of imaging, on an imaging element, object light passed through an interchangeable lens mounted via a camera mount;
a step of acquiring information concerning the interchangeable lens mounted on the camera mount; and
a step of determining whether or not the interchangeable lens is communicable;
a step of causing an electronic viewfinder to superimpose and display an optical image of an object which goes through an optical system different from the interchangeable lens and a taken image based on an image signal generated by the imaging element if it is determined that the interchangeable lens is not communicable.

* * * * *